US012607857B2

(12) United States Patent (10) Patent No.: US 12,607,857 B2
Xiong et al. (45) Date of Patent: Apr. 21, 2026

(54) OPTICAL DISPLAY SYSTEM AND ELECTRONICS APPARATUS

(71) Applicants: University of Central Florida Research Foundation, Inc., Orlando, FL (US); Goertek Inc., Weifang (CN)

(72) Inventors: Jianghao Xiong, Orlando, FL (US); Tao Zhan, Oviedo, FL (US); Junyu Zou, Orlando, FL (US); Kun Li, Santa Clara, CA (US); Shin-Tson Wu, Oviedo, FL (US)

(73) Assignees: University of Central Flroida Research Foundation, Inc., Orlando, FL (US); Goertek Inc., Weifang (CN)

( * ) Notice: Subject to any disclaimer, the term of this patent is extended or adjusted under 35 U.S.C. 154(b) by 320 days.

(21) Appl. No.: 18/276,772

(22) PCT Filed: Dec. 31, 2021

(86) PCT No.: PCT/CN2021/143866
§ 371 (c)(1),
(2) Date: Aug. 10, 2023

(87) PCT Pub. No.: WO2022/179312
PCT Pub. Date: Sep. 1, 2022

(65) Prior Publication Data
US 2024/0134196 A1      Apr. 25, 2024
US 2024/0231097 A9      Jul. 11, 2024

Related U.S. Application Data

(60) Provisional application No. 63/154,139, filed on Feb. 26, 2021.

(51) Int. Cl.
G02B 27/01         (2006.01)
G02B 3/10          (2006.01)
(Continued)

(52) U.S. Cl.
CPC ........... G02B 27/0172 (2013.01); G02B 3/10 (2013.01); G02B 27/024 (2013.01);
(Continued)

(58) Field of Classification Search
CPC .... G02B 27/0172; G02B 30/30; G02B 30/25; G02B 3/10; G02B 27/024; G02B 27/286;
(Continued)

(56) References Cited

U.S. PATENT DOCUMENTS

2015/0346495 A1    12/2015  Welch et al.
2018/0172999 A1     6/2018  Sulai et al.
(Continued)

*Primary Examiner* — Stephone B Allen
*Assistant Examiner* — Boutsikaris Leonidas
(74) *Attorney, Agent, or Firm* — Baker Botts LLP

(57) ABSTRACT

An optical display system and a head-mounted display electronics apparatus are disclosed. The optical display system comprises: an image-generating apparatus, which generates image light; and an image-viewing apparatus, which guides the image light to eyes of a viewer, wherein the image-viewing apparatus comprises an imaging optical assembly and a multifocal assembly placed, the multifocal assembly has at least two optical powers and is programmable to choose at least one of the optical powers at a given time.

11 Claims, 8 Drawing Sheets

(51) Int. Cl.

| | |
|---|---|
| *G02B 27/02* | (2006.01) |
| *G02B 27/28* | (2006.01) |
| *G02B 27/42* | (2006.01) |
| *G02B 30/25* | (2020.01) |
| *G02B 30/30* | (2020.01) |

(52) U.S. Cl.
CPC ....... *G02B 27/286* (2013.01); *G02B 27/4261* (2013.01); *G02B 27/4272* (2013.01); *G02B 30/25* (2020.01); *G02B 30/30* (2020.01); *G02B 2027/0134* (2013.01)

(58) Field of Classification Search
CPC ............ G02B 27/4261; G02B 27/4272; G02B 2027/0134
USPC ........................................................ 359/630
See application file for complete search history.

(56) References Cited

U.S. PATENT DOCUMENTS

| | | | |
|---|---|---|---|
| 2019/0212700 A1* | 7/2019 | An ........................... | G02B 13/18 |
| 2021/0231952 A1* | 7/2021 | Jamali ................ | G02B 27/0025 |
| 2022/0107500 A1* | 4/2022 | Khorasaninejad ... | H04N 13/211 |

* cited by examiner

OPTICAL DISPLAY SYSTEM AND ELECTRONICS APPARATUS

CROSS-REFERENCE TO RELATED APPLICATIONS

This application is a National Stage of International Application No. PCT/CN2021/143866, filed on Dec. 31, 2021, which claims priority to U.S. Application No. 63/154, 139, filed Feb. 26, 2021, both of which are hereby incorporated by reference in their entireties.

FIELD OF THE INVENTION

Embodiments of the disclosure pertain to optical display systems, and more particularly, to an optical display system and an electronics apparatus.

BACKGROUND OF THE INVENTION

Head-mounted display (HMD) can be used to present a three dimensional (3D) virtual content to a user. For example, a virtual reality (VR) display is a wearable headset to display virtual three dimensional (3D) contents with applications including but not limited to immersive video games and interactive 3D graphics. An augmented reality (AR) display presents 3D virtual content in overlap with the real world environment. A critical issue with HMDs is the vergence accommodation conflict (VAC) which causes serious discomfort to the viewer.

Conventionally, stereoscopic images with fixed optical depth are displayed separately to left and right eyes in a HMD to produce an illusion 3D effect. However, the fixed optical depth of display may differ from the actual intended depth of 3D object. This mismatch is referred as VAC that may lead to double images, eyestrain and nausea. To alleviate VAC, the display depth should be adjustable to accommodate the variable depth of virtual 3D content.

SUMMARY OF THE INVENTION

One object of this disclosure is to provide a new technical solution for an optical display system.

According to a first aspect of the present disclosure, there is provided an optical display system, comprising: an image-generating apparatus, which generates image light; and an image-viewing apparatus, which guides the image light to eyes of a viewer, wherein the image-viewing apparatus comprises an imaging optical assembly and a multifocal assembly placed, the multifocal assembly has at least two optical powers and is programmable to choose at least one of the optical powers at a given time.

According to a first aspect of the present disclosure, there is provided an electronics apparatus, comprising the optical display system according to an embodiment.

In various embodiment, the vergence accommodation conflict of an optical display system can be relieved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF THE EMBODIMENTS

Figures 1A, 1B:
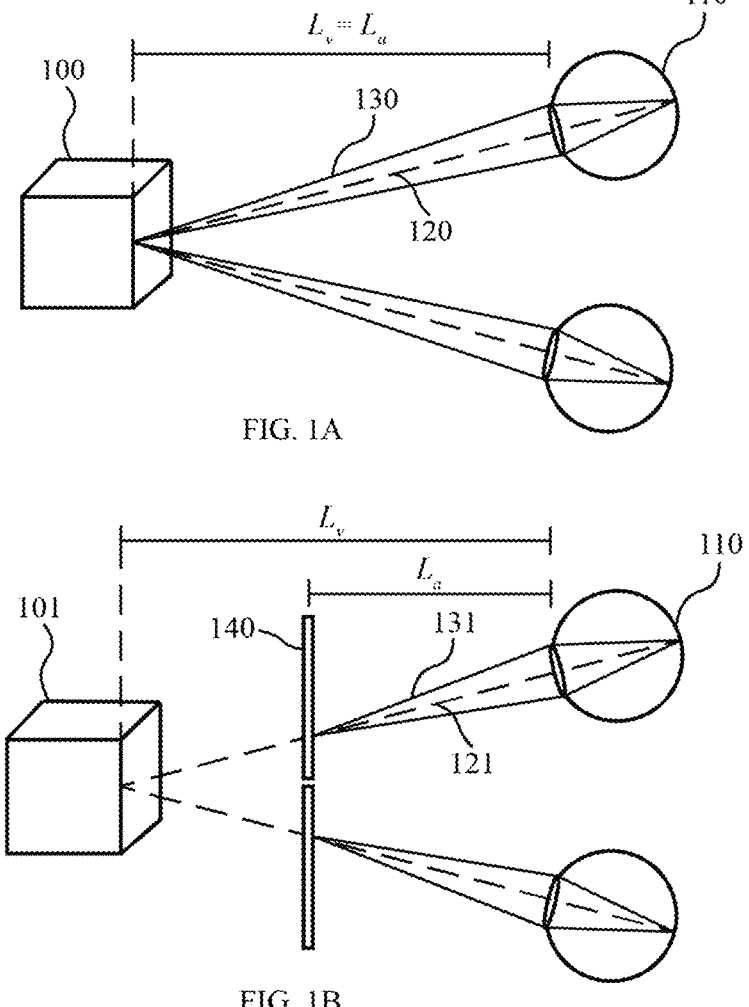
FIG. 1A-1B are schematic diagrams illustrating the formation of vergence accommodation conflict.

Various exemplary embodiments of the disclosure will now be described in detail with reference to the drawings. It should be noted that the relative arrangement of the components and steps, the numerical expressions, and numerical values set forth in these embodiments do not limit the scope of the disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 6:
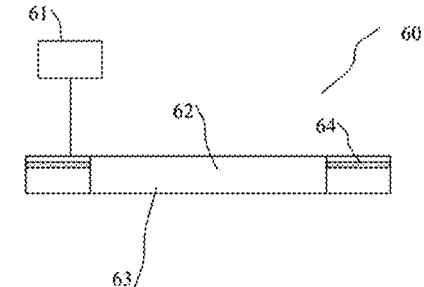
FIG. 6 illustrates a schematic diagram of an optical display system according to an embodiment.

FIG. 6 illustrates a schematic diagram of an optical display system according to an embodiment.

As shown in FIG. 6, the optical display system 60 comprises an image-generating apparatus 61 and an image-viewing apparatus 62. The image-generating apparatus 61 generates image light. The image-viewing apparatus 62 guides the image light to eyes of a viewer.

The image-viewing apparatus 62 comprises an imaging optical assembly 63 and a multifocal assembly 64. The multifocal assembly 64 has at least two optical powers and is programmable to choose at least one of the optical powers at a given time.

The optical display system 60 can be used for head-mounted display addressing vergence accommodation conflict issues.

The multifocal assembly 64 is programmable to choose at least one of the optical powers at a given time. So, it will change the optical powers during displaying. For example, during a video is being displayed, the changing of optical powers by the multifocal assembly 64 will let a user to change the accommodation cue. This will relieve the VAC to some degree.

The multifocal assembly 64 may be arranged at the output side of the image-viewing apparatus 62. For example, the multifocal assembly 64 can be placed in front of the imaging optical assembly 63.

In an embodiment, the multifocal assembly 64 comprises a plurality of successively disposed lens modules, and each of the lens module comprises a diffractive lens. Each of the lens module comprises a polarization converter corresponding to the diffractive lens. The polarization converter is controlled to control diffraction of the corresponding diffractive lens.

For example, the polarization converter is configurable to be in an "off" state or an "on" state, and the image light is circularly polarized light. When the polarization converter is in the "on" state, the polarization converter changes circularly polarized light with one handedness to circularly polarized light with the other handedness, and when the polarization converter is in the "off" state, the polarization converter does not change the polarization state of the circularly polarized light. The diffractive lens may be a Pancharatnam-Berry liquid crystal lens. The Pancharatnam-Berry liquid crystal lens has opposite optical power for input circularly polarized light with opposite handedness.

In such a manner, the multifocal assembly 64 can change optical powers as required to relieve VAC issues.

In another embodiment, the image-generating apparatus 61 includes a display device and a local backlight device mounted at the back of the display device. The local backlight device in the image-generating apparatus is synchronized with the image viewing apparatus.

The synchronized local backlight device and multifocal assembly are adjusted in a group of temporal sequences.

In this embodiment, by simultaneously controlling the lit-up segments in the local backlight device and image depth in the multifocal assembly, local regions of the image generated by the display device can be imaged at different depths. The multifocal assembly and the backlight device can be used in a synchronized manner. This will actively direct a user to change his accommodation cue, so as to relieve the VAC issues actively.

For example, in each sequence, the multifocal assembly 64 is adjusted to a focal depth and the backlight device is configured to light up a portion of segments corresponding to the focal depth. As such, a user's eyes will be attracted by the lit-up portion and change his accommodation cue.

In another embodiment, the summed time of one group of temporal sequences is equal to an image refreshing time of the display device. When the displayed image is refreshed, the objects in the image will be changed. In such a situation, the accommodation cue and the vergence cue shall change accordingly. This embodiment provides an ability of adjusting accommodation cue in synchronization with the changes of displayed images in a video.

In another embodiment, the choice of focal depths generated by the multifocal assembly and lit-up segments in the backlight device are updated according to a content of virtual 3D scene in a corresponding refreshing frame of the display device. Because the focal depths can be changed according to the content of virtual 3D scene, the user shall adjust his eye muscle to adjust the accommodation cue. As such, the VAC will be relieved.

More detailed examples will be described with reference to FIG. 1 to FIG. 5 as below.

Many HMDs have the problem of vergence accommodation conflict. Vergence is related to the rotation of eyes. The intersecting point of optical axes of left and right eyes is the vergence cue. Accommodation is the focusing behavior of eyes. The focal distance of eyes is the accommodation cue.

FIG. 1A shows an example of how human eyes view 3D objects in real world. The viewer is looking at an object 100. The eyes 110 has vergence cue 120 at distance $L_v$. The accommodation cue 130 is at the same distance $L_a = L_v$.

FIG. 1B shows an example of the viewer looking at a stereoscopic display. The virtual 3D object 101 is shown on display image planes 140 with separate images for left and right eyes. The vergence cue 121 is at the 3D object with distance $L_v$. The accommodation cue 131 has to be on image planes 140 for a clear image. The accommodation distance L a is no longer equal to vergence distance $L_v$.

The embodiments disclosed here provide an HMD electronics apparatus with local depth modulation function such that the focal distance of virtual 3D image can be adjusted to match a viewer's vergence distance to some degree. In most situation, two focal depths, such as near field and remote field, will be enough to relieve the VAC issue.

Figures 2A, 2B:
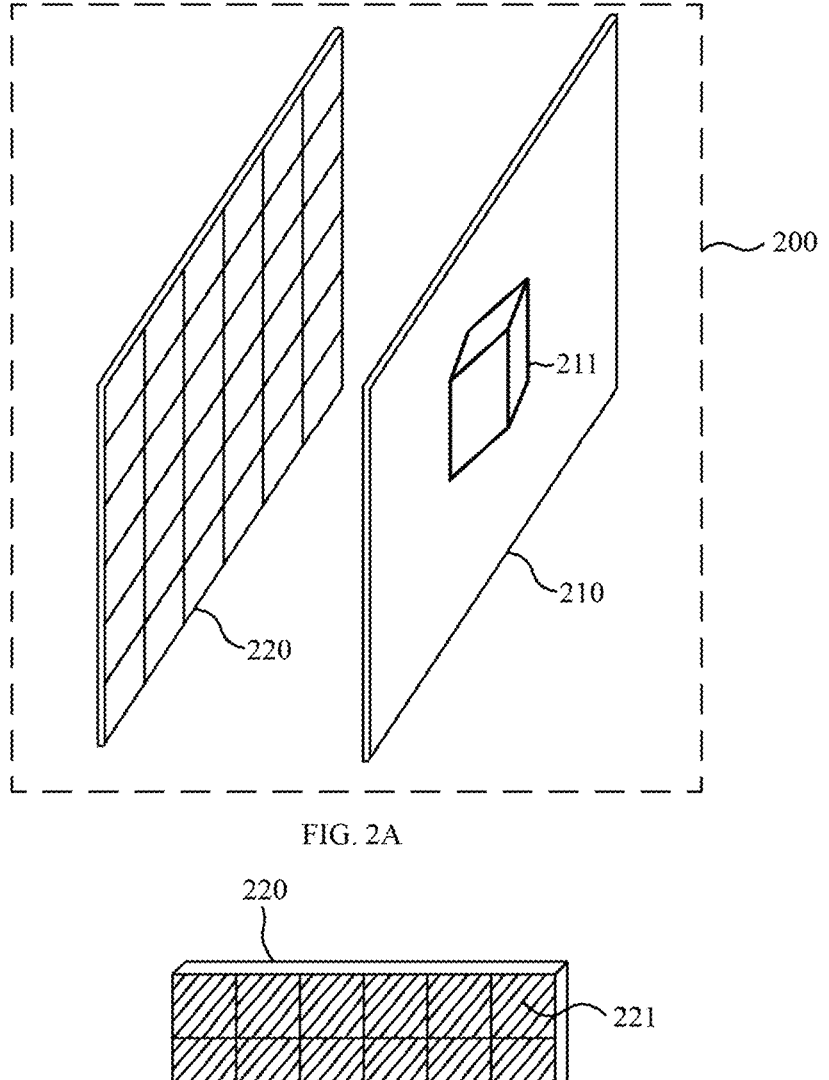
FIG. 2A is a perspective view of a controllable display apparatus according to an embodiment.
FIG. 2B is a perspective view of a local backlight device according to an embodiment.

FIG. 2A is an example of controllable display apparatus/image-generating apparatus 200, in accordance with some embodiments. The apparatus 200 includes a display device 210 and a local backlight device 220. For example, the display device 210 is an intensity modulation display, which can be an LCD display. The display device 210 may be configured to output image of polarized light, such as circularly polarized light. The local backlight device 220 can be segmented and be configured such that each individual segment can be programmed to control the output light intensity. FIG. 2B shows an example of the local backlight device 220 with on-state segment 221 and off-state segment 222.

Figures 3A, 3B:
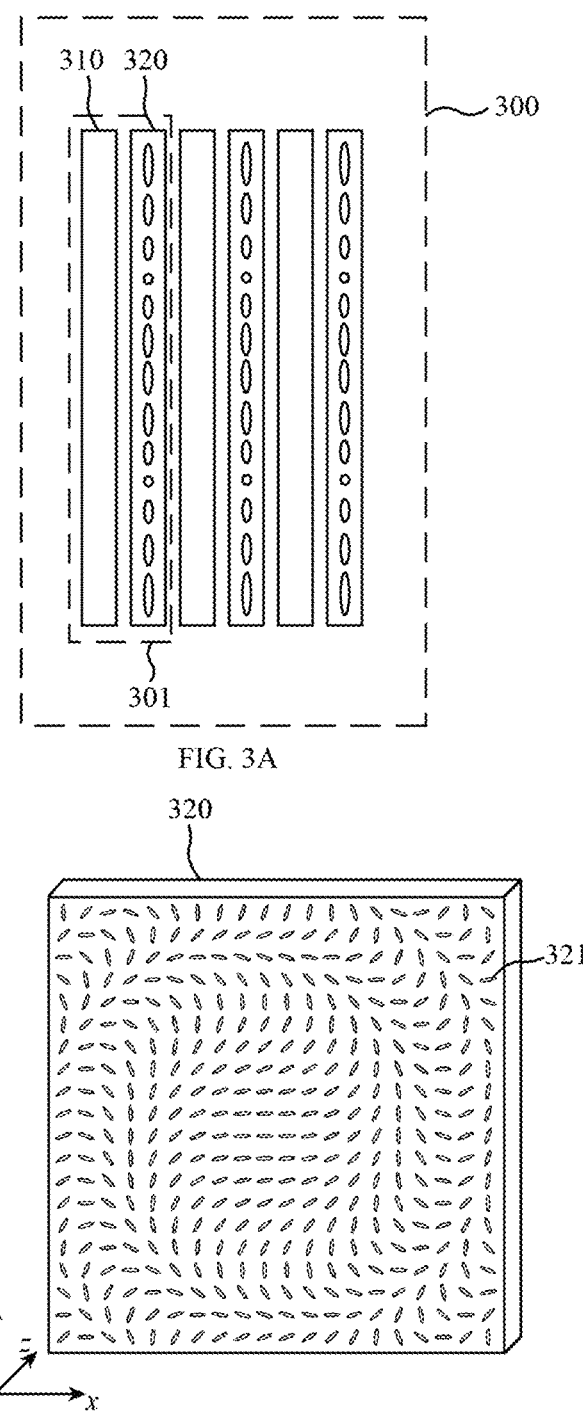
FIG. 3A illustrates an example of multifocal assembly according to an embodiment.
FIG. 3B illustrates an example of Pancharatnam Berry liquid crystal lens according to an embodiment.

FIG. 3A is an example of a multifocal assembly 300 with three LC lens modules 301, in accordance with some embodiments. The number of module 301 is only for the purpose of description and should not be limiting. The module 301 includes a polarization converter 310 and a PB LC lens 320. The polarization converter 310 has the function of converting input circularly polarized light with one handedness to circularly polarized light with the other handedness. The converting function of the polarization converter 310 can be electronically controlled by a switch to determine whether the function is on or off. In some embodiments, device 310 can be a homogenous LC cell, a vertical LC cell, a TN LC cell with quarter-wave plates on input and output sides.

FIG. 3B shows an example of LC PB lens 320. The pattern in FIG. 3B is the bottom alignment pattern with the alignment director 321 rotating in the x-y plane. The rotating angle θ of director 321 should be determined by Equation (1):

$$\theta = \left( \sqrt{x^2 + y^2 + f^2} - f \right) \frac{\pi}{\lambda f} \tag{1}$$

where x and y denote spatial coordinates with origin of lens center, f denotes the lens focal length, λ denotes the light wavelength. The LC molecules in direct contact with alignment follow the pattern. However, in direction normal to substrate, there can be additional twist of LC molecules.

Figures 3C, 3D:
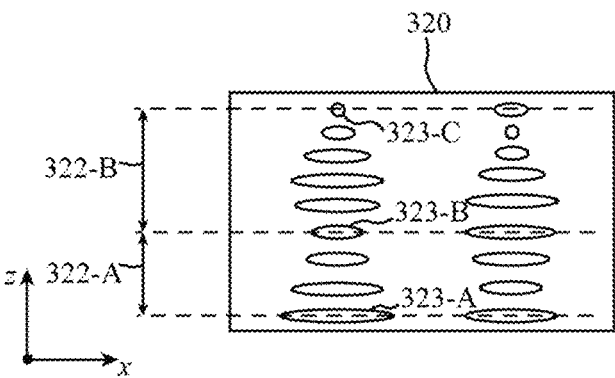
FIG. 3C-3D illustrate an example of multiple layer structure in Pancharatnam Berry liquid crystal lens according to an embodiment.

FIGS. 3C and 3D depict an exemplary double twisting layer structure. The number of total twisting layers is only for purpose of description and should not be limiting. The bottom LC molecule 323-A follows the alignment pattern. In z direction, the LC molecules stays in x-y plane, with azimuthal rotation. In the first twist layer with thickness 322-A, the LC molecules have rotating angle 324-A, as shown in FIG. 3C. Likewise in the second layer with thickness 322-B, the LC molecules have rotating angle 324-B shown in FIG. 3D. The thickness value 322-A and 322-B, and rotating angle values 324-A and 324-B can take arbitrary values for practical applications. However, the final multiple twisting structure should satisfy the half-wave condition where input circularly polarized light with one handedness is converted to circularly polarized light with the other handedness. The multiple twisting structure can, in some embodiments, increase the efficiency of PB LC lens to achieve larger angular bandwidth and spectral bandwidth.

Figure 4A:
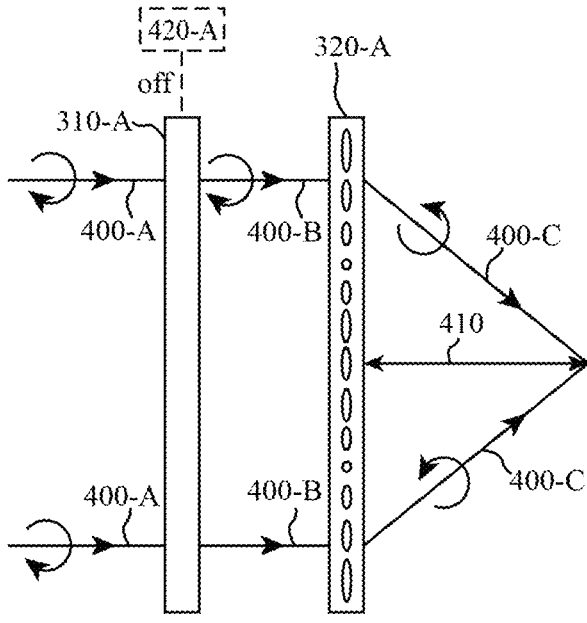
FIG. 4A-4B illustrate an example of lens module with controllable focal length.
Figure 4B:
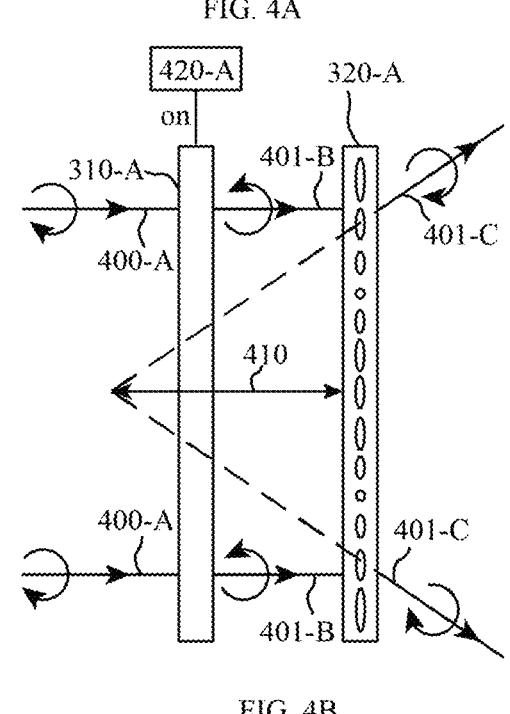

FIGS. 4A and 4B illustrate the modulation of optical power of a PB LC lens 320-A by controlling polarization converter 310. In an exemplary embodiment, a switch 420-A is connected to polarization converter 310-A. When the switch 420-A is at off state, an input RCP light 400-A passes a polarization converter 310 without changing polarization state and becomes RCP light 400-B. RCP Light 400-B passes PB LC lens 320-A and becomes LCP light 400-C. Light 400-C converges to a point with distance 410 from lens 320. When switch 420-A is at on state, an input RCP light 400-A is converted to LCP light 401-B after the polarization converter 310-A. LCP light 410-B passes PB LC lens and is diverged. The diverging point of light 401-C has distance 410 to PB LC lens 320-A. The converging and diverging modes have opposite optical powers. When combining a plurality of lens modules 301 together, multiple focal depths can be achieved.

Figure 4C:
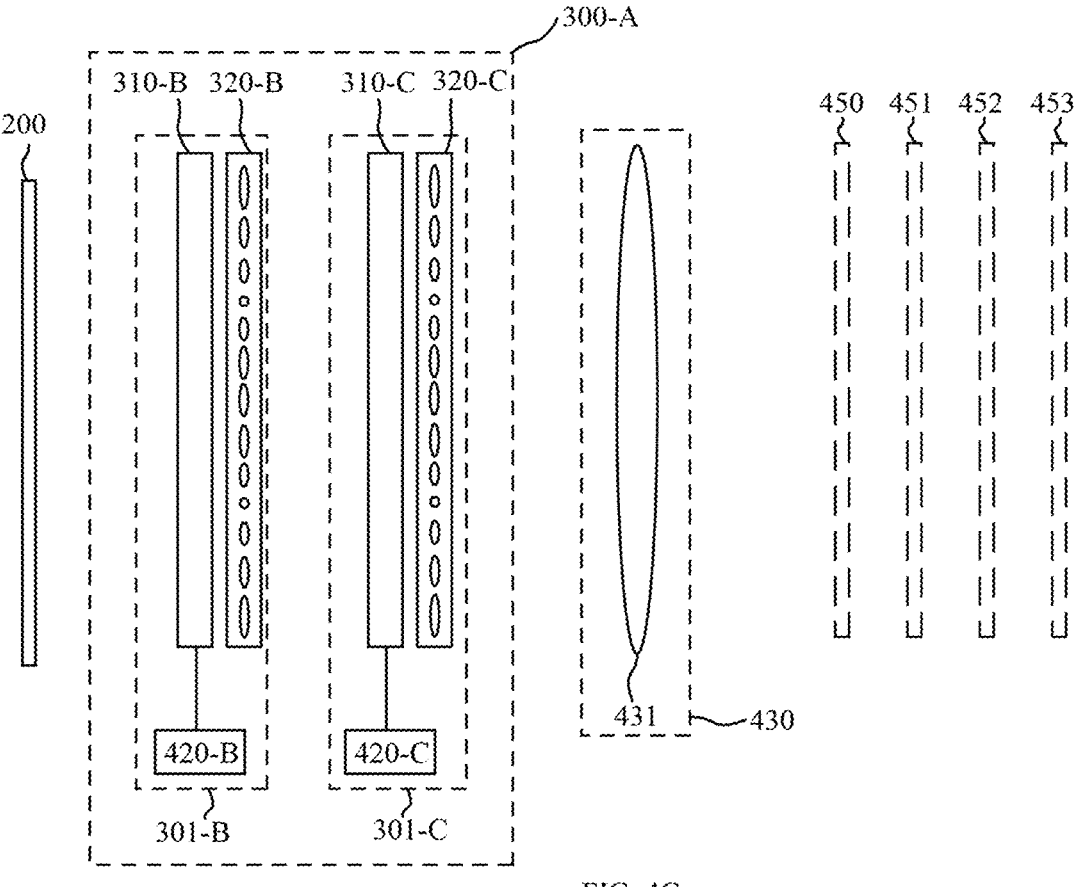
FIG. 4C illustrates an example of multifocal assembly to produce multiple virtual planes.

FIG. 4C illustrates an exemplary embodiment of a multifocal assembly 300-A with two lens modules 301-B and 301-C. The number of lens modules is for purpose of description and should not be limiting. The imaging optical assembly 430 has a bi-convex lens 431. In some embodiments, imaging optical assembly 430 can be a plano-convex lens, a Fresnel lens, a pancake system with multiple lenses or other configurations with function of imaging controllable display apparatus 200 to a far viewing distance. Virtual image planes 450,451,452,453 are four possible image planes of controllable display apparatus 200. Electronic switches 420-B and 420-C control which virtual image plane to be used. In an exemplary embodiment, when switch 420-B and 420-C are both off, display apparatus 200 is imaged at virtual plane 450. When 420-B are on and 420-C are off, display apparatus 200 is imaged at virtual plane 451. When 420-B are off and 420-C are on, display apparatus 200 is imaged at virtual plane 452. When 420-B and 420-C are both on, display apparatus 200 is imaged at virtual plane 453. The number of possible virtual planes is equal to two to the power of the number of lens module 301. The separations among virtual planes are determined by the optical power of each lens module 301.

Figure 5A:
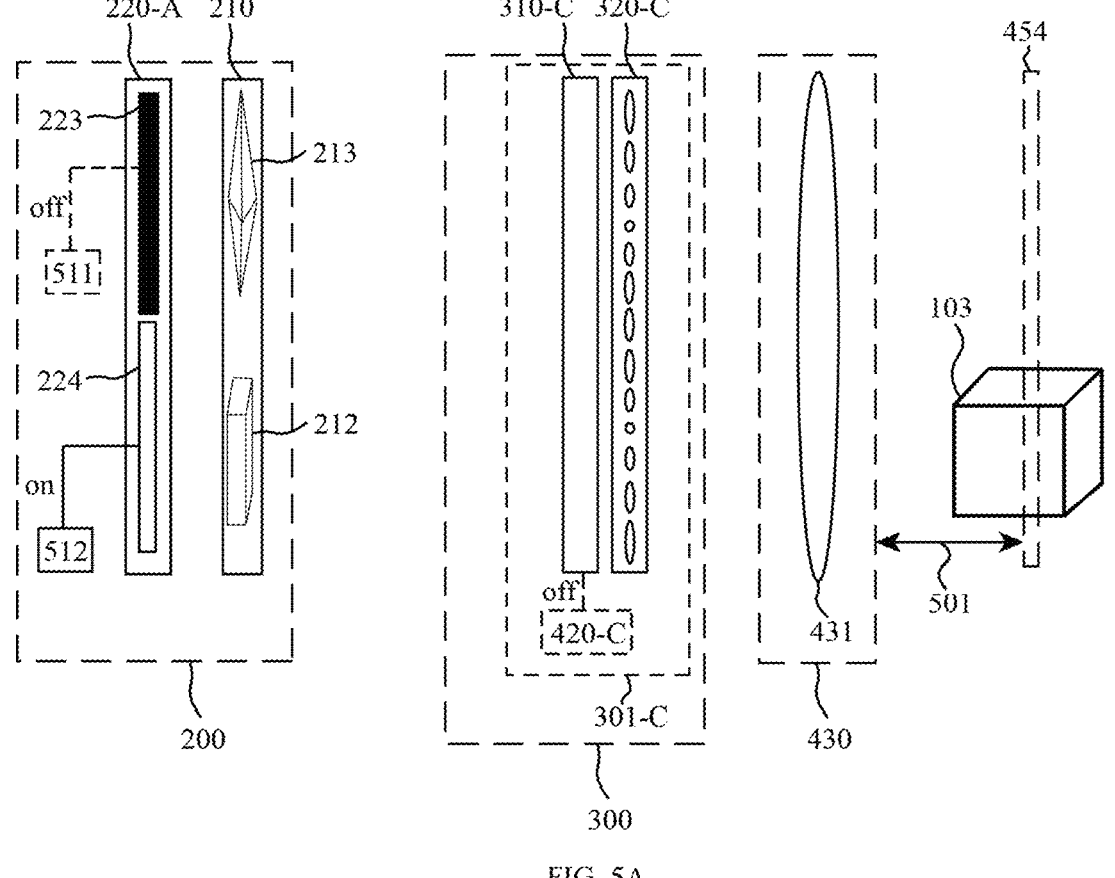
FIG. 5A-5B illustrate an example of optical system with depth modulation.
Figure 5B:
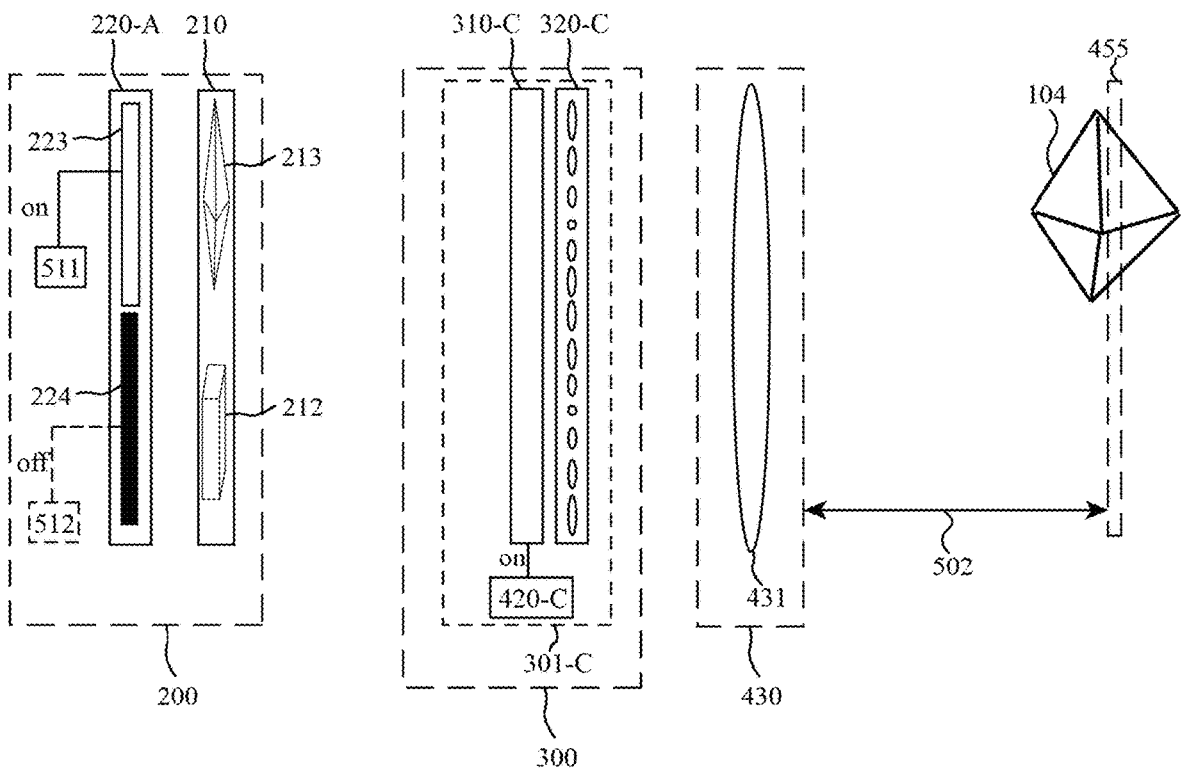

FIGS. 5A and 5B illustrate an example of optical display system with depth modulation. The purpose is to display two virtual 3D objects 103 at depth 501 and 104 at depth 502. The multifocal assembly 300 includes one LC lens module 301-C. Electronic switch 420-C controls polarization converter 310-C. The imaging optical assembly 430 and PB LC lens 320-C produces two possible depths 501 and 502. When switch 420-C is off, the controllable display apparatus 220 is imaged at virtual plane 454. When switch 420-C is on, the controllable display apparatus 220 is imaged at virtual plane 455. The controllable display apparatus 200 has a backlight device 220-A with two segments 223 and 224 controlled by electronic switch 511 and 512. The display device 210 shows image 212 for 3D object 103 and image 213 for 3D object 104 simultaneously in a same main frame. The main frame is divided into two sub frames. In the first sub frame shown in FIG. 5A, electronic switch 511 is off and electronic switch 512 is on. Segment 224 emits light and light up image 212. Segment 223 is at dark state and image 213 is not visible to viewer. Electronic switch 420-C in multifocal assembly 300 is off. Image 212 is imaged at virtual plane 454. In the second sub frame shown in FIG. 5B, electronic switch 511 is on and electronic switch 512 is off. Image 213 is lit up and image 212 is at dark state. Electronic switch 420-C in multifocal assembly is on. Image 213 is imaged at virtual plane 455. The position of virtual planes 454 and 455 are configured such that 3D objects 103 and 104 are close to at least one virtual plane.

The number of lens module 301-C in FIGS. 5A and 5B is for purpose of description and should not be limiting. In some embodiments, more than one lens module 301-C is used to achieve a larger number of virtual planes. The number of virtual planes is equal to two to the power of lens module 301-C. A larger number of virtual planes can divide the space with smaller separations between adjacent virtual planes. In each main frame, a plurality of selected virtual planes in total available virtual planes is used to display the 3D scene. The number of selected virtual planes and choice of selection may be varied in different main frames, according to the specific configuration of 3D scene in the main frame. The number of sub frames in each main frame is equal to the number of selected virtual planes. In each sub frame, one virtual plane is used to image local content with on-status backlight segments in display device 210. The number of segments (223 and 224) and corresponding electronic switches (511 and 512) in backlight device 220-A is for description purpose and should not be limiting. A larger number of segments can divide image content in display device 210 with higher resolution. The number of 3D objects (103 and 104) is for purpose of description and should not be limiting. In some embodiments, there can be arbitrary number of 3D objects with arbitrary spatial configurations in a 3D scene. The display content in display device 210 should satisfy condition such that perceived contents by viewer are as close to intended original 3D scene as possible.

In some embodiments, the optical display system includes a controllable display apparatus with local backlight and a controllable image viewing apparatus with multiple depths. The controllable display apparatus includes an optical image-generating component and a local backlight component. The optical image-generating component includes a programmable light intensity modulation device adapted to generate a polarized image output. The local backlight component includes a segmented LED illumination device where the light intensity of each segment can be independently controlled. The controllable image viewing apparatus includes an imaging optical assembly and a multifocal assembly. The imaging optical assembly has a fixed large optical power is disposed to focus light from the optical image-generating apparatus to a far viewing distance. The multifocal assembly has an adjustable optical power to further control the image depth.

In some embodiments, the multifocal assembly includes a plurality of successively configured optical components. Each optical component includes an active polarization converter and a Pancharatnam Berry (PB) liquid crystal (LC) lens. The polarization converter is controllable and converts the polarization state of incident light between left circular polarization (LCP) and right circular polarization (RCP). The LC lens has opposite optical powers for light with orthogonal circular polarization states.

In some embodiments, the optical image-generating component displays the image at a main frame rate. In each main frame, there may exist a plurality of sub frames. In each sub frame, the backlight component and multifocal assembly are configured to map local regions of the optical image-generating apparatus to different depths. While the local depth is configured in each sub frame, the content in the image-generating apparatus stays unchanged.

In some embodiment, an optical display system to deliver a virtual 3D scene is provided, which comprises: an optical image-generating apparatus and a controllable image viewing apparatus disposed to focus virtual image at a plurality of virtual planes. The optical image-generating apparatus includes a controllable display apparatus adapted to generate a polarized image output.

In an example, the controllable display apparatus includes a display device and a local backlight device. The display device is programmable to modulate the spatial light intensity distribution of transmitted light to form a polarized image. The local backlight device is a segmented light emitting diode (LED) device with each segment programmable to control the LED light intensity.

In another example, the controllable image viewing apparatus includes an imaging optical assembly and a multifocal assembly, wherein the imaging optical assembly has a fixed optical power and is configured to focus image from the optical image-generating apparatus to a far viewing distance from viewer. The multifocal assembly has a plurality of possible optical power and is programmable to choose which optical to use.

In another example, the multifocal assembly includes a plurality of successively disposed lens modules. Each lens module includes a controllable polarization converter and a Pancharatnam-Berry liquid crystal lens. The controllable polarization converter is configurable to be in any of an "off" state or an "on" state. In the "on" state, the controllable polarization converter changes input circularly polarized light with one handedness to circularly polarized light with the other handedness. In the "off" state, the controllable does not change the polarization state of input circularly polarized light.

For example, the Pancharatnam-Berry liquid crystal lens has opposite optical power for input circularly polarized light with opposite handedness.

For example, the Pancharatnam-Berry liquid crystal lens has one or more than one layers. The liquid crystal molecules in each layer spatially rotate along the direction normal to the lens surface.

For example, the local backlight device in multifocal assembly is synchronized with the controllable image viewing apparatus.

For example, the refreshing frame rate of controllable display apparatus is equal to the refreshing frame rate of virtual 3D scene.

In another embodiment, the synchronized local backlight device and multifocal assembly are adjusted in a group of temporal sequences. In each sequence the multifocal assembly is adjusted to a focal depth and the backlight device is configured to light up a portion of segments. The summed time of one group of temporal sequences is equal to the image refreshing time in the controllable display apparatus. The choice of focal depths generated by the multifocal assembly and lit-up segments in the backlight device are updated according to the content of virtual 3D scene in the corresponding refreshing frame.

The embodiments of this disclosure can be summarized as below.

In various embodiment, an optical display system, comprising: an image-generating apparatus, which generates image light; and an image-viewing apparatus, which guides the image light to eyes of a viewer.

Optional and alternatively, the optical display system is for delivering a virtual 3D scene formed at least through the image light.

Optional and alternatively, the image light generated by the image-generating apparatus is polarized.

Optional and alternatively, the image-viewing apparatus focuses a virtual image formed by the image light at at least two virtual planes.

Optional and alternatively, the image-generating apparatus includes a display device and a local backlight device mounted at the back of the display device.

Optional and alternatively, the display device modulates a spatial light intensity distribution of image light to form a polarized image.

Optional and alternatively, the local backlight device is a segmented light emitting diode (LED) device.

Optional and alternatively, each segment of the segmented light emitting diode (LED) device is programmable to control the LED light intensity.

Optional and alternatively, the image-viewing apparatus includes an imaging optical assembly and a multifocal assembly.

Optional and alternatively, the imaging optical assembly has a fixed optical power and is configured to focus an image formed by the image light from the optical image-generating apparatus to a far viewing distance from a viewer.

Optional and alternatively, the multifocal assembly has at least two optical powers and is programmable to choose at least one of the optical powers at a given time.

Optional and alternatively, the multifocal assembly includes a plurality of successively disposed lens modules.

Optional and alternatively, each of the lens module includes a diffractive lens.

Optional and alternatively, the diffractive lens is a liquid crystal lens.

Optional and alternatively, the diffractive lens is a Pancharatnam-Berry liquid crystal lens.

Optional and alternatively, each of the diffractive lens diffracts the image light with a respective polarization. Each of the lens module includes a polarization converter corresponding to the diffractive lens. The polarization converter is controlled to control diffraction of the corresponding diffractive lens.

Optional and alternatively, the polarization converter is configurable to be in an "off" state or an "on" state.

Optional and alternatively, the image light is circularly polarized light. When the polarization converter is in the "on" state, the polarization converter changes circularly polarized light with one handedness to circularly polarized light with the other handedness. When the polarization converter is in the "off" state, the polarization converter does not change the polarization state of the circularly polarized light.

Optional and alternatively, the Pancharatnam-Berry liquid crystal lens has opposite optical power for input circularly polarized light with opposite handedness.

Optional and alternatively, the Pancharatnam-Berry liquid crystal lens has one or more than one layers.

Optional and alternatively, the liquid crystal molecules in each layer of the Pancharatnam-Berry liquid crystal lens spatially rotate along the direction normal to the lens surface.

Optional and alternatively, the local backlight device in the image-generating apparatus is synchronized with the image viewing apparatus.

Optional and alternatively, a refreshing frame rate of controllable display system is equal to a refreshing frame rate of the virtual 3D scene.

Optional and alternatively, the synchronized local backlight device and multifocal assembly are adjusted in a group of temporal sequences.

Optional and alternatively, in each sequence the multifocal assembly is adjusted to a focal depth and the backlight device is configured to light up a portion of segments corresponding to the focal depth.

Optional and alternatively, the summed time of one group of temporal sequences is equal to an image refreshing time of the display apparatus.

Optional and alternatively, the choice of focal depths generated by the multifocal assembly and lit-up segments in the backlight device are updated according to the content of virtual 3D scene in the corresponding refreshing frame.

Optional and alternatively, directors of the Pancharatnam-Berry liquid crystal lens rotate in the x-y plane.

Optional and alternatively, the rotating angle $\theta$ of the directors is determined by the following equation:

$$\theta = \left(\sqrt{x^2 + y^2 + f^2} - f\right)\frac{\pi}{\lambda f}$$

Figure 7:
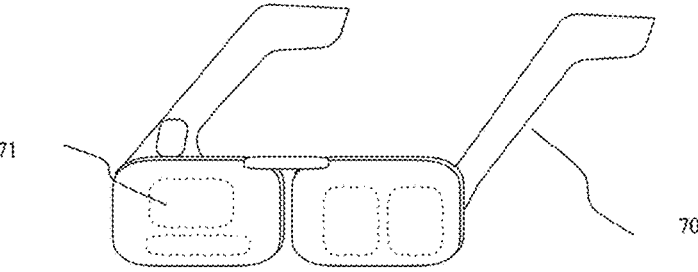
FIG. 7 illustrates a head-mounted display electronics apparatus according to an embodiment.

FIG. 7 illustrates a head-mounted display electronics apparatus according to an embodiment. As shown in FIG. 7, the head-mounted display electronics apparatus 70 comprises the optical display system 71 as described above. The head-mounted display electronics apparatus 70 may be a wearable headset, including an AR headset and a VR headset.

Although some specific embodiments of the disclosure have been demonstrated in detail with examples, it should be understood by a person skilled in the art that the above examples are only intended to be illustrative but not to limit the scope of the disclosure.

What is claimed is:

1. An optical display system, comprising:

an image-generating apparatus, adapted to generate image light, wherein the image-generating apparatus includes a display device and a backlight device mounted at back of the display device; and an image-viewing apparatus, adapted to guide the image light to eyes of a viewer, wherein the backlight device comprises a plurality of segments, and each of the plurality of segments is adapted to be programmed to control a corresponding output light intensity, wherein the image-viewing apparatus comprises an imaging optical assembly and a multifocal assembly, the multifocal assembly has at least two optical powers and is adapted to choose at least one of the optical powers at a given time, and wherein the backlight device and the multifocal assembly are configured to be adjusted synchronously in a group of temporal sequences, so that in each sequence the multifocal assembly is adjusted to a focal depth, and the backlight device is configured to light up a portion of the plurality of segments corresponding to the focal depth.

2. The optical display system according to claim 1, wherein the multifocal assembly comprises a plurality of successively disposed lens modules, and each of the lens module comprises a diffractive lens, wherein each of the lens module comprises a polarization converter corresponding to the diffractive lens.

3. The optical display system according to claim 2, wherein the polarization converter is configurable to be in an "off" state or an "on" state, wherein the image light is circularly polarized light, and wherein, when the polarization converter is in the "on" state, the polarization converter is adapted to change circularly polarized light with one handedness to circularly polarized light with the other handedness, and when the polarization converter is in the "off" state, the polarization converter is adapted to not change the polarization state of the circularly polarized light.

4. The optical display system according to claim 3, wherein the diffractive lens is a Pancharatnam-Berry liquid crystal lens.

5. The optical display system according to claim 4, wherein the Pancharatnam-Berry liquid crystal lens has opposite optical power for input circularly polarized light with opposite handedness.

6. The optical display system according to claim 1, wherein the summed time of one group of temporal sequences is equal to an image refreshing time of the display device.

7. The optical display system according to claim 1, wherein the choice of focal depths generated by the multifocal assembly and lit-up segments in the backlight device are updated according to a content of virtual 3D scene in a corresponding refreshing frame of the display device.

8. The optical display system according to claim 1, wherein the optical display system is used for head-mounted display.

9. A head-mounted display electronics apparatus, comprising an optical display system according to claim 1.

10. The optical display system according to claim 1, wherein the display device displays the image at a main frame rate, a main frame comprises a plurality of sub frames, in each sub frame, the backlight device and the multifocal assembly are configured to image local regions of the image to different depths.

11. The optical display system according to claim 10, wherein a local depth is corresponded to each sub frame, and content in the image-generating apparatus stays unchanged.

* * * * *